United States Patent
Park et al.

(10) Patent No.: US 10,920,112 B2
(45) Date of Patent: *Feb. 16, 2021

(54) PRESSURE-SENSITIVE ADHESIVE COMPOSITION FOR FOLDABLE DISPLAY

(71) Applicant: LG CHEM, LTD., Seoul (KR)

(72) Inventors: Hyon Gyu Park, Daejeon (KR); Dong Kyu Roh, Daejeon (KR); Yoon Kyung Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 73 days.

This patent is subject to a terminal disclaimer.

(21) Appl. No.: 16/331,743

(22) PCT Filed: Sep. 8, 2017

(86) PCT No.: PCT/KR2017/009876
§ 371 (c)(1),
(2) Date: Mar. 8, 2019

(87) PCT Pub. No.: WO2018/048245
PCT Pub. Date: Mar. 15, 2018

(65) Prior Publication Data
US 2019/0233682 A1 Aug. 1, 2019

(30) Foreign Application Priority Data

Sep. 9, 2016 (KR) .................. 10-2016-0116324
Sep. 7, 2017 (KR) .................. 10-2017-0114558

(51) Int. Cl.
| | | |
|---|---|---|
| *C09J 7/38* | (2018.01) | |
| *C09J 183/04* | (2006.01) | |
| *C09J 7/00* | (2018.01) | |
| *C09J 7/25* | (2018.01) | |
| *C09J 7/40* | (2018.01) | |
| C08G 77/18 | (2006.01) | |
| C08G 77/16 | (2006.01) | |
| C08G 77/20 | (2006.01) | |

(52) U.S. Cl.
CPC . *C09J 7/38* (2018.01); *C09J 7/00* (2013.01); *C09J 7/255* (2018.01); *C09J 7/401* (2018.01); *C09J 183/04* (2013.01); C08G 77/16 (2013.01); C08G 77/18 (2013.01); *C08G 77/20* (2013.01); *C09J 2203/00* (2013.01)

(58) Field of Classification Search
CPC ....... C09J 7/38; C09J 7/00; C09J 7/255; C09J 7/401; C09J 183/04; C09J 2203/00; C09J 77/18; C09J 77/16; C09J 77/20
See application file for complete search history.

(56) References Cited

U.S. PATENT DOCUMENTS

2008/0319099 A1  12/2008  Zhou et al.

FOREIGN PATENT DOCUMENTS

| | | | |
|---|---|---|---|
| JP | 2004-339305 A | 12/2004 | |
| KR | 10-2007-0096278 A | 10/2007 | |
| KR | 10-0839780 B | 6/2008 | |
| KR | 10-1110534 B | 1/2012 | |
| KR | 10-2012-0059512 A | 6/2012 | |
| KR | 10-1284968 B | 7/2013 | |
| KR | 10-2015-0011230 A | 1/2015 | |
| KR | 10-2015-0097533 A | 8/2015 | |
| KR | 10-2016-0083583 A | 7/2016 | |
| KR | 1020160083583 A | * 7/2016 | ................ C09J 7/02 |
| KR | 10-2016-0100575 A | 8/2016 | |
| WO | 2009144192 A1 | 12/2009 | |

OTHER PUBLICATIONS

International Search Report and Written Opinion issued for PCT Application No. PCT/KR2017/009876 dated Dec. 12, 2017, 10 pages.
Communication and Supplementary European Search Report dated Jul. 19, 2019, for EP application No. 17849129.6, 7 pages.
Decision of Rejection dated Oct. 6, 2020 for Japanese Patent Application No. 2019-500648, 6 pages.

* cited by examiner

*Primary Examiner* — Robert S Jones, Jr.
(74) *Attorney, Agent, or Firm* — Rothwell, Figg, Ernst & Manbeck, P.C.

(57) ABSTRACT

The present application relates to a pressure-sensitive adhesive composition for a foldable display and a use thereof. The pressure-sensitive adhesive composition of the present application has excellent bending reliability while having appropriate adhesive force and cohesive force, thereby being useful for forming a pressure-sensitive adhesive layer for a foldable display having improved release force.

12 Claims, No Drawings

PRESSURE-SENSITIVE ADHESIVE COMPOSITION FOR FOLDABLE DISPLAY

CROSS-REFERENCE TO RELATED APPLICATIONS

This application is a 35 U.S.C. § 371 National Phase Entry Application from PCT/KR2017/009876, filed on Sep. 8, 2017, and designating the United States, which claims the benefit of priority under Korean Patent Application No. 10-2016-0116324 on Sep. 9, 2016 and Korean Patent Application No. 10-2017-0114558 on Sep. 7, 2017, the disclosures of are incorporated herein by reference in their entirety.

TECHNICAL FIELD

The present application relates to a pressure-sensitive adhesive composition for a foldable display and a use thereof.

BACKGROUND ART

Recently, with the development of display related technologies, display devices that can be deformed at the use stage, such as folding, winding in a roll form, or stretching like a rubber band are being studied and developed. Since these displays can be modified into various forms, it is possible to satisfy both demands for enlargement of the display at the use stage and miniaturization of the display for carrying.

The deformable display device can be modified in various forms in accordance with the requirements of the user or depending on the needs of situations where the display device is used, as well as capable of being transformed into a predetermined form. Therefore, it is necessary to recognize the deformed shape of the display and to control the display device in accordance with the recognized shape.

On the other hand, since the deformable display device has a problem that each of constitutions of the display device is damaged according to the modification, each of the constitutions of the display device must satisfy folding reliability and stability.

PRIOR ART DOCUMENTS

Patent Documents

Patent Document 1: Korean Laid-Open Patent Publication No. 2015-0011230 A

DISCLOSURE

Technical Problem

The present application provides a pressure-sensitive adhesive composition for a foldable display and a use thereof.

The present application provides a pressure-sensitive adhesive composition for a foldable display having excellent bending reliability and also capable of forming a pressure-sensitive adhesive layer having improved releasing peel force to a fluorine-base release film by satisfying a storage elastic modulus in a predetermined range over a wide temperature interval, for example, a temperature interval of −40° C. to 90° C.

The present application also provides a foldable display comprising a pressure-sensitive adhesive layer having excellent adhesive force and cohesive force, while having bending reliability suitable for a foldable display, and a method for manufacturing the same.

Technical Solution

The present application relates to a pressure-sensitive adhesive composition for a foldable display and a use thereof.

The pressure-sensitive adhesive composition according to the present invention has a storage elastic modulus of not more than $5.0 \times 10^6$ Pa after curing over a wide temperature interval, for example, a temperature interval of −40° C. to 90° C. and thus has physical properties suitable for use in a foldable display.

In addition, the pressure-sensitive adhesive composition according to the present application can provide a pressure-sensitive adhesive composition for a foldable display which has appropriate adhesion and cohesive force and can further secure the storage elastic modulus range described above.

Furthermore, the pressure-sensitive adhesive composition according to the present application can form a pressure-sensitive adhesive layer having suitable releasing peel force to the fluorine-based release film, thereby improving a non-peeling problem depending on the adhesive property from the release film.

Such a pressure-sensitive adhesive composition is cured, for example, to form a pressure-sensitive adhesive layer, where the pressure-sensitive adhesive layer is contained in a foldable display, for example, formed on a base film and may exist on one side or both sides of a polarizing plate.

In the present application, the term "foldable display" may mean a flexible display having a radius of curvature in a folded portion of less than 5 mm by being designed such that it can be repeatedly folded and spread like a paper.

The pressure-sensitive adhesive applied to the foldable display must satisfy bending reliability, unlike conventional pressure-sensitive adhesives, and in order for such bending reliability to be excellent, rheologic physical properties, for example, a storage elastic modulus should be maintained within an appropriate range over the temperature range in which an actual foldable display can be used.

On the other hand, in order to satisfy desired rheologic physical properties, the content of the MQ resin contained in the pressure-sensitive adhesive composition or the structure of the silicone gum may be changed, where such a pressure-sensitive adhesive composition may have a low storage elastic modulus.

However, when the storage elastic modulus of the pressure-sensitive adhesive composition is lowered, adhesive force with a release peeling liner attached to one or both sides of the pressure-sensitive adhesive layer formed by curing the pressure-sensitive adhesive composition, for example, a fluorine-based release film, is excessively increased, and thus there is a problem that release force can disappear.

Accordingly, the applicant has found that when a pressure sensitive adhesive composition is prepared by mixing a high pressure-sensitive adhesive and a low pressure-sensitive adhesive component having an appropriate storage elastic modulus and having a low storage elastic modulus in a predetermined content, the composition can prevent decrease of folding reliability depending on a rapid rise in rheologic physical properties while having appropriate adhesive force and minimize a variation width of the storage elastic modulus within the commercial temperature range, and reached the present invention.

That is, the present application comprises a first pressure-sensitive adhesive and a second pressure-sensitive adhesive. The pressure-sensitive adhesive composition comprises the first pressure-sensitive adhesive in a ratio of 5 wt % to 50 wt % of the total solid content of the composition, and also satisfies Equation 1 below.

$$A<20 \text{ gf/in} \qquad \text{[Equation 1]}$$

In Equation 1, A means a peel force of a pressure-sensitive adhesive layer formed by curing the pressure-sensitive adhesive composition on a fluorine-based release film as measured at a peel rate of 0.3 m/min and a peel angle of 180 degrees.

That is, the pressure-sensitive adhesive composition according to the present application can have a low peel force on a fluorine-based release film by mixing a high-pressure-sensitive adhesive component and a low-pressure-adhesion component having a low storage elastic modulus in a predetermined ratio.

In another example, the peel force of the pressure-sensitive adhesive layer formed by curing the pressure-sensitive adhesive composition according to the present application on the fluorine-based release film as measured at a peel rate of 0.3 m/min and a peel angle of 180 degrees may be 15 gf/in or less, 14 gf/in or less, 13 gf/in or less, 12 gf/in or less, 11 gf/in or less, or 10 gf/in or less.

The first pressure-sensitive adhesive comprises a first silicone gum and a first MQ resin, and has a peel force on a glass substrate of 10 gf/in or less, as measured at a peel rate of 0.3 m/min and a peel angle of 180 degrees.

The first pressure-sensitive adhesive comprises, as a low pressure-sensitive adhesive component having a low pressure-sensitive adhesive force, a first silicone gum.

The term "silicone gum" herein is commonly called a polyorganosiloxane compound ordinarily contained in a silicone-based pressure-sensitive adhesive, which can play a role of imparting a constant storage elastic modulus and cohesive force to the pressure-sensitive adhesive composition.

In one example, the first silicone gum may be represented by Formula 1 below.

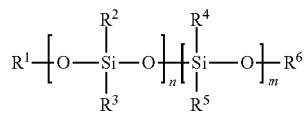

[Formula 1]

In Formula 1 above, $R^1$ and $R^6$ are each independently a silyl group or silanol group with or without an alkyl group, an alkenyl group or an aryl group, $R^2$ to $R^5$ are each independently an alkyl group, an alkenyl group or an aryl group, and n and m are each independently an integer in a range of 1 to 10,000.

In the present application, the term "alkyl group" may mean an alkyl group having 1 to 20 carbon atoms, 1 to 16 carbon atoms, 1 to 12 carbon atoms, 1 to 8 carbon atoms, 1 to 6 carbon atoms or 1 to 4 carbon atoms, unless otherwise specified. The alkyl group may be linear, branched or cyclic. The alkyl group can be exemplified by a linear or branched alkyl group such as a methyl group, an ethyl group, an n-propyl group, an isopropyl group, an n-butyl group, an isobutyl group, a sec-butyl group, a t-butyl group, an n-pentyl group, an isopentyl group, a neopentyl group, an n-hexyl group, an n-heptyl group or an n-octyl group, or a cycloalkyl group such as a cyclobutyl group, a cyclopentyl group, a cyclohexyl group or a cycloheptyl group, and the like. In addition, the alkyl group may be optionally substituted with one or more substituents.

In the present application, the term "alkenyl group" may mean an alkenyl group having 2 to 20 carbon atoms, 2 to 16 carbon atoms, 2 to 12 carbon atoms, 2 to 8 carbon atoms, 2 to 6 carbon atoms, or 2 to 4 carbon atoms, unless otherwise specified. The alkenyl group may be linear, branched or cyclic. The alkenyl group can be exemplified by a vinyl group, a 1-propenyl group, a 2-propenyl group, a 1-butenyl group, a 2-butenyl group or a 3-butenyl group, and the like. Also, the alkenyl group may be optionally substituted with one or more substituents.

In the present application, the term "aryl group" may mean a monovalent residue derived from a compound comprising a benzene ring or a structure in which two or more benzene rings are condensed or bonded, or a derivative thereof, unless otherwise specified. In the range of the aryl group, not only a functional group commonly called an aryl group, but also a so-called aralkyl group or arylalkyl group, and the like can be included. The aryl group may be, for example, an aryl group having 6 to 25 carbon atoms, 6 to 21 carbon atoms, 6 to 18 carbon atoms, or 6 to 12 carbon atoms. The aryl group can be exemplified by a phenyl group, a phenoxy group, a phenoxyphenyl group, a phenoxybenzyl group, a dichlorophenyl group, a chlorophenyl group, a phenylethyl group, a phenylpropyl group, a benzyl group, a tolyl group, a xylyl group or a naphthyl group, and the like. In addition, the aryl group may be optionally substituted with one or more substituents.

In the present application, the term "silanol group" means a functional group comprising Si—OH units.

In the present application, the term "silyl group" means a generic term of a functional group comprising silicon atoms.

In the present application, a specific functional group, for example, the substituent which may be substituted in the alkyl group, alkenyl group or aryl group can be exemplified by an alkyl group, an alkoxy group, an alkenyl group, an epoxy group, a cyano group, a thiol group, a carboxyl group, an acryloyl group, a methacryloyl group, an acryloyloxy group, a methacryloyloxy group or aryl group, and the like, but is not limited thereto.

The first silicone gum may have, for example, a number average molecular weight in a range of 400,000 to 800,000. Within the range of the number average molecular weight, it is possible to provide a pressure-sensitive adhesive composition preventing a rapid change in storage elastic modulus and having an appropriate cohesive force.

Here, the number average molecular weight may be a value measured by a known measuring method using gel permeation chromatography (GPC).

In another example, the silicone gum may have a number average molecular weight in the range of 500,000 to 800,000 or 700,000 to 800,000.

The first silicone gum may also have a suitable cross-linkable functional group to have a good cross-linking degree.

In one example, the first silicone gum may have a content of a cross-linkable functional group, for example, a vinyl group in a range of 0.5 mol % to 1.5 mol % or 0.5 mol % to 1 mol %. Within the content range of the cross-linkable functional group as above, it is possible to have a good cross-linking degree and to secure appropriate pressure-sensitive adhesive force and cohesive force.

The first pressure-sensitive adhesive may also comprise an MQ resin.

Here, the term "MQ resin" also means a silicone compound having a three-dimensional reticular steric molecular structure comprising a monofunctional siloxane unit (hereinafter, referred to as "M unit") and a tetrafunctional siloxane unit (hereinafter, referred to as "Q unit"). In addition, the MQ resin may further comprise other bifunctional siloxane units (hereinafter, referred to as "D units") or trifunctional siloxane units (hereinafter, referred to as "T units").

Here, the M unit means a unit represented by a formula $(R_3SiO_{1/2})$ in the industry; the D unit means a unit represented by a formula $(R_2SiO_{2/2})$ in the industry; the T unit means a unit represented by a formula $(R_2SiO_{3/2})$ in the industry; and the "Q unit" means a unit represented by a formula $(SiO_{4/2})$. Here, R means a functional group bonded to a silicon atom (Si).

The MQ resin plays a role of imparting pressure-sensitive adhesive force into the pressure-sensitive adhesive, where the first pressure-sensitive adhesive is a low pressure-sensitive adhesive having a relatively low peel force on a glass substrate as compared with the second pressure-sensitive adhesive, so that it may have a very low content of MQ resin.

In one example, the first pressure-sensitive adhesive may comprise the first MQ resin in a content of less than 5 wt %. If the content of the first MQ resin is 5 wt % or more, the pressure-sensitive adhesive force may be excessively increased and the storage elastic modulus may be changed radically, which is not preferable.

In another example, the first pressure-sensitive adhesive may comprise the first MQ resin in a content of less than 4 wt %, less than 3 wt %, less than 2 wt %, or less than 1 wt %. The lower limit value of the first MQ resin content may be, for example, 0.0001 wt % or more, 0.001 wt % or more, or 0.01 wt % or more.

In a specific example, the first pressure-sensitive adhesive may comprise 0.0001 to 5 parts by weight of the first MQ resin relative to 100 parts by weight of the first silicone gum. In another example, it may comprise 0.001 to 4.5 parts by weight or 0.01 to 4 parts by weight of the first MQ resin.

The first MQ resin may be represented by, for example, Formula 2 below, but is not limited thereto.

[Formula 2]

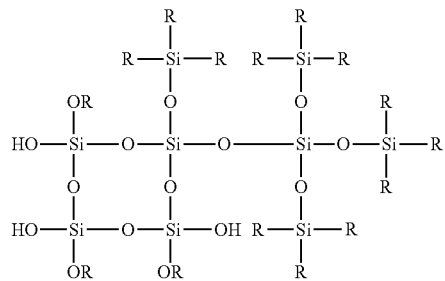

In Formula 2 above, R is hydrogen, a monovalent hydrocarbon group, or an alkenyl group.

The monovalent hydrocarbon group can be exemplified by an alkyl group, an aliphatic cyclic group or an aromatic cyclic group, and the like.

More specifically, the alkyl group can be exemplified by an alkyl group such as methyl, ethyl, propyl or pentyl, and the aliphatic cyclic group can be exemplified by cyclohexyl or the like, and the aromatic cyclic group can be exemplified by phenyl, tolyl, xylyl or benzyl, and the like, without being limited thereto.

Furthermore, the alkenyl group can be exemplified by vinyl, allyl, butenyl, hexenyl or cyclohexenyl, and the like.

Meanwhile, the monovalent hydrocarbon group or the alkenyl group may exist in a radical form.

The first MQ resin may further comprise, for example, a D unit or a T unit, where it is preferred that the ratio of the D unit and the T unit further included is less than 5 mol %.

For example, the first MQ resin may have a ratio of the M unit to the Q unit (M:Q) in a range of 0.6:1 to 1.7:1 or 0.7:1 to 1:1. When the M unit is less than 0.6 relative to the Q unit, the initial pressure-sensitive adhesive force may be lowered, and when it exceeds 1.7, the cohesive force may be lowered, which is not preferable.

The first MQ resin may comprise a silanol group, where the content of the silanol group may be, for example, in the range of 0.1 mol % to 8 mol % or 0.2 mol % to 5 mol %. When the content of the silanol group is less than 0.1 mol %, the cross-linking density is lowered and the cohesive force is lowered, which is not preferable, and when it exceeds 8 mol %, the adhesive force is lowered, which is not preferable.

The first MQ resin may comprise, for example, the hydrogen atom in a ratio of 1 to 3 mol % relative to the entire functional group bonded to the silicon atom. By controlling the ratio of the hydrogen atom within the above range, it is possible to prevent an uncured problem, or deterioration of storage stability or the like.

The first MQ resin may have, for example, a number average molecular weight in the range of 3,000 to 7,000. When the MQ resin having a number average molecular weight within the above range is used, excellent cohesive force and adhesive force can be achieved.

The above-described first pressure-sensitive adhesive is a low pressure-sensitive adhesive having a low adhesive force, and has a peel force on a glass substrate of 10 gf/in or less, as measured at a peel rate of 0.3 m/min and a peel angle of 180 degrees. In another example, the peel force on a glass substrate may be 9 gf/in or less, 8 gf/in or less, 7 gf/in or less, 6 gf/in or less, 5 gf/in or less, 4 gf/in or less, or 3 gf/in or less. The lower limit value of the peel force of the first pressure-sensitive adhesive on a glass substrate is not particularly limited, but may be 0.1 gf/in or more, for example.

The first pressure-sensitive adhesive may be included in the composition in a range of 5 wt % to 50 wt % relative to the total solid content of the composition. In another example, the first pressure-sensitive adhesive may be included in the composition in a range of 8 wt % to 45 wt % or 10 wt % to 30 wt % relative to the total solid content of the composition.

The pressure-sensitive adhesive composition of the present application further comprises a second pressure-sensitive adhesive. The second pressure-sensitive adhesive has a peel force on a glass substrate of 200 gf/in to 400 gf/in, as measured at a peel rate of 0.3 m/min and a peel angle of 180 degrees.

The second pressure-sensitive adhesive is a high pressure-sensitive adhesive component having a relatively high pressure-sensitive adhesive force as compared with the first pressure-sensitive adhesive, and has a high peel force on a glass substrate.

The second pressure-sensitive adhesive comprises a second silicone gum and a second MQ resin.

The second pressure-sensitive adhesive may have a storage elastic modulus measured at $-40°$ C. of $10^7$ Pa or less.

When the second pressure-sensitive adhesive having the storage elastic modulus as described above is mixed with the first pressure-sensitive adhesive, a pressure-sensitive adhesive composition capable of improving the desired release peel force problem on the fluorine-based release film and also having a storage elastic modulus after curing over a temperature interval of −40° C. to 90° C., of $5.0 \times 10^6$ Pa or less, can be provided.

The second silicone gum may be the same as or different from the above-described first silicone gum.

In one example, the second silicone gum may have a structure different from the above-described first silicone gum.

More specifically, the second silicone gum may have a low cross-linking degree and a high cross-linking density in order to ensure high adhesive properties despite the second pressure-sensitive adhesive of the low MQ resin content.

In one example, the second silicone gum may be linear polydimethylsiloxane comprising hydroxy groups at both ends. The linear polydimethylsiloxane having hydroxy groups at both ends means polydimethylsiloxane having a linear structure in which in Formula 1 above, $R^2$ to $R^5$ are all methyl groups and $R^1$ and $R^6$ are $Si(CH_3)_2OH$.

The linear polydimethylsiloxane may be, for example, one that the hydroxy group is in a range of 0.5 mol % to 5 mol % or 1 mol % to 4 mol % relative to the total methyl groups contained in the polydimethylsiloxane. When the hydroxy group is in the above range, it is possible to prevent a curing problem, such as the uncured, by achieving an appropriate cross-linking degree, and to improve long-term properties such as a storage property.

The second silicone gum may also have a number average molecular weight in the range of 500,000 to 1,000,000. In another example, the second silicone gum may have a number average molecular weight in the range of 500,000 to 900,000 or 700,000 to 900,000. When the silicone gum having the number average molecular weight within the above range is used, it is possible to provide a pressure-sensitive adhesive composition preventing a rapid change of a storage elastic modulus over an interval from a low temperature of 40° C. and a high temperature of 90° C. and having an appropriate cohesive force.

The second silicone gum may have an appropriate viscosity in consideration of pressure-sensitive adhesive force, workability and reactivity with the MQ resin, and the like.

The second silicone gum may have, for example, a viscosity measured under a condition of 25° C. and 50% relative humidity in a range of 1,000,000 cP to 100,000,000 cP. In another example, the second silicone gum may have a viscosity measured under a condition of 25° C. and 50% relative humidity in the range of 1,500,000 cP to 70,000,000 cP. If the viscosity is less than 1,000,000 cP, the reactivity or the pressure-sensitive adhesive force may be lowered, and if the viscosity exceeds 100,000,000 cP, the workability may be significantly lowered.

The second MQ resin may be the same as or different from the above-described first MQ resin.

The second MQ resin is a component that provides the adhesive force and cohesive force of the pressure-sensitive adhesive, like the first MQ resin, and a constitution that can change the storage elastic modulus according to the content thereof.

On the other hand, the second pressure-sensitive adhesive has a high pressure-sensitive adhesive property, and may have the MQ resin content higher than that of the first pressure-sensitive adhesive. However, when the content of the second MQ resin is too large, the storage elastic modulus of the second pressure-sensitive adhesive may exceed $10^7$ Pa at −40° C., so that the second pressure-sensitive adhesive may comprise the second MQ resin within an appropriate range.

In one example, the second pressure-sensitive adhesive may comprise the second MQ resin in a content of 40 wt % or less. In another example, the second pressure-sensitive adhesive may comprise the second MQ resin in a ratio of 38 wt % or less, 36 wt % or less, 34 wt % or less, 32 wt % or less, or 30 wt % or less, and preferably, it may be 36 wt % or less. The lower limit value of the second MQ resin content may be, for example, 5 wt % or more, 10 wt % or more, or 15 wt % or more. When the content of the second MQ resin in the second pressure-sensitive adhesive is controlled within the above range, it is possible to provide a second pressure-sensitive adhesive having a storage elastic modulus at −40° C. of $1.0 \times 10^7$ Pa or less.

In a specific example, the second pressure-sensitive adhesive may comprise 60 to 95 parts by weight of a second silicone gum and 5 to 40 parts by weight of a second MQ resin. In another example, the second pressure-sensitive adhesive comprises 64 to 90 parts by weight of a second silicone gum and 10 to 36 parts by weight of a second MQ resin, or 70 to 85 parts by weight of a second silicone gum and 15 to 30 parts by weight of a second MQ resin.

The pressure-sensitive adhesive composition of the present application comprises the above-described first pressure-sensitive adhesive and second pressure-sensitive adhesive in a predetermined ratio.

In one example, the pressure-sensitive adhesive composition comprises the first pressure-sensitive adhesive in a range of 5 wt % to 50 wt % relative to the total solid content of the composition. In another example, the pressure-sensitive adhesive composition may comprise the first pressure-sensitive adhesive in a range of 8 wt % to 40 wt % or 9 wt % to 35 wt % of the total solid content.

The content of the second pressure-sensitive adhesive can be changed depending on the content of the first pressure-sensitive adhesive in the pressure-sensitive adhesive composition, and for example, the second pressure-sensitive adhesive can be included in the pressure-sensitive adhesive composition in a content within the range of 50 wt % to 95 wt %, 55 wt % to 94 wt %, or 70 wt % to 90 wt %, relative to the total solid content of the composition.

The pressure-sensitive adhesive composition for a foldable display according to the present application may further comprise an organic solvent.

The organic solvent has solubility in the silicone gum and the MQ resin, which can be exemplified by, for example, a saturated hydrocarbon-based organic solvent, a halogenated hydrocarbon solvent, and an aromatic hydrocarbon-based organic solvent.

The saturated hydrocarbon-based organic solvent can be exemplified by, for example, pentane, isopentane, cyclopentane, hexane, cyclohexane, heptane, isoheptane, cycloheptane, octane, isooctane or cyclooctane, and the like; the halogenated hydrocarbon solvent can be exemplified by trichloroethane or chloroform, and the like; and the aromatic hydrocarbon-based organic solvent can be exemplified by, for example, benzene, xylene or toluene, and the like, but are not limited thereto.

The pressure-sensitive adhesive composition for a foldable display according to the present application may further comprise known additives such as an oxidation inhibitor or a curing catalyst, and the kind and content thereof may be easily designed and changed by those skilled in the art, in consideration of the curing type of the first and second pressure-sensitive adhesives or the object of the present application.

On the other hand, the pressure-sensitive adhesive composition for a foldable display according to the present application has an advantage that the desired storage elastic modulus range at a low temperature can be achieved owing to the addition of a low pressure-sensitive adhesive such as the first pressure-sensitive adhesive, but there is a concern that the adhesive force is lowered. Therefore, by comprising a borane compound, a borate compound and a mixture thereof, the pressure-sensitive adhesive composition may also overcome the above-described problem.

The pressure-sensitive adhesive composition for a foldable display of the present application can have a storage elastic modulus (G') after curing of $5.0 \times 10^6$ Pa or less in a temperature range of $-40°$ C. to $90°$ C. by comprising the above-described first and second pressure-sensitive adhesives.

The storage elastic modulus may be, for example, a value measured according to a manual using a rheometer (Advanced Rheometric Expansion System, Ta Instruments) under a condition of a frequency of 0.1 rad/s to 100 rad/s and a strain rate of 10% or less.

In one example, the storage elastic modulus may be measured using a G2 series rheometer from TA instruments under a condition of a frequency of 6.2 rad/s and a strain rate of 10% or less depending on temperatures, while varying the temperature from $-40°$ C. to $90°$ C., and derived.

In addition, the lower limit value of the storage elastic modulus after curing of the pressure-sensitive adhesive composition within the above temperature range may be, for example, $1.0 \times 10^3$ Pa.

In a more specific example, the pressure-sensitive adhesive composition of the present application has a storage elastic modulus value in the range of $1.0 \times 10^3$ Pa to $5.0 \times 10^6$ Pa, $5.0 \times 10^3$ Pa to $3.0 \times 10^6$ Pa or $1.0 \times 10^4$ Pa to $1.0 \times 10^6$ Pa over a temperature interval of $-40°$ C. to $90°$ C. Within the above storage elastic modulus range, it is possible to secure the superiority of the bending reliability suitable for the foldable display.

The present application is also directed to a foldable display. The foldable display of the present application can secure excellent bending reliability required for a foldable display by comprising the pressure-sensitive adhesive layer which is a cured product of the above-described pressure-sensitive adhesive composition.

That is, the present application is directed to a foldable display comprising a pressure-sensitive adhesive layer which is a cured product of a pressure-sensitive adhesive composition for a foldable display attached to an adherend. The pressure-sensitive adhesive composition comprises a first pressure-sensitive adhesive and a second pressure-sensitive adhesive, and satisfies Equation 1 below.

$$A < 20 \text{ gf/in} \qquad \text{[Equation 1]}$$

In Equation 1, A means a peel force of a pressure-sensitive adhesive layer formed by curing the pressure-sensitive adhesive composition on a fluorine-based release film as measured at a peel rate of 0.3 m/min and a peel angle of 180 degrees.

The pressure-sensitive adhesive layer in the foldable display of the present application is attached on the adherend.

The adherend may be, for example, a base film.

The base film may also be, for example, a transparent base film having a haze of 10% or less, or 5% or less, or may also be a colored base film having a haze of 30% or more.

As the base film, for example, those formed from polyolefin such as polyethylene or polypropylene; polyester such as polyethylene terephthalate and polyethylene naphthalate; cellulose such as triacetylcellulose, diacetylcellulose, propionylcellulose, butylcellulose or acetylcellulose; polyamide such as 6-nylon or 6,6-nylon; an acrylic polymer such as polymethyl methacrylate; and an organic polymer such as polystyrene, polyvinyl chloride, polyimide, polyvinyl alcohol, polycarbonate or ethylene vinyl alcohol can be used, without being limited thereto.

The base film may also be one formed from one or a mixture of two or more of the foregoing or a polymer, and may also be one having a structure in which a plurality of layers are laminated.

The base film may be, for example, one whose surface has been modified. The surface modification may be performed for the purpose of increasing the pressure-sensitive adhesive force with the pressure-sensitive adhesive layer, and specifically, a treatment method such as chemical treatment, corona discharge treatment, mechanical treatment, ultraviolet (UV) treatment, active plasma treatment or glow discharge treatment may be adopted, without being limited thereto.

In one example, when the adherend is a base film, the base film and the pressure-sensitive adhesive layer may have increased adhesive force by the above surface treatment of the base film and a surface treatment process of a pressure-sensitive adhesive layer to be described below.

That is, in the case of performing the surface treatment process of the base film, functional groups such as —OH is induced on the base film, and the functional group can help to firmly maintain bonding between the base film and the pressure-sensitive adhesive layer as a whole, by forming covalent bonds with the silanol groups.

Specifically, when a treatment such as chemical treatment, corona discharge treatment, mechanical treatment, ultraviolet (UV) treatment, active plasma treatment or glow discharge treatment is performed on the adherend, functional groups such as —OH are formed on the adherend, and when the pressure-sensitive adhesive layer is subjected to a surface treatment using any one of the above treatment methods, silanol groups are formed on the pressure-sensitive adhesive layer, so that when the two layers have been laminated, the base film and the pressure-sensitive adhesive layer can form covalent bonds via the silanol groups.

By performing the surface treatment process as above, it is possible to secure not only bending reliability but also superiority of interface adhesive force or cohesive force at the same time.

Furthermore, the base film may comprise known additives, such as an antistatic agent, an ultraviolet absorber, an infrared absorber, a plasticizer, a lubricant, a colorant, an antioxidant or a flame retardant, and the like.

The pressure-sensitive adhesive layer may be a layer formed by curing the pressure-sensitive adhesive composition for a foldable display comprising the first pressure-sensitive adhesive and the second pressure-sensitive adhesive.

The pressure-sensitive adhesive layer may be, for example, one whose surface has been modified. The surface modification can be carried out to maintain a firm adhesive force with the adherend, for example, the base film. The surface modification method may be appropriately adopted from the above-described methods for modifying the surface of the base film.

Through the surface modification, silanol groups can be formed in the pressure-sensitive adhesive layer, and the silanol groups can form covalent bonds with functional groups such as —OH on the base film.

By the surface treatment of the adherend and the adhesive layer as above, the adherend and the pressure-sensitive adhesive layer can ensure excellent adhesive force.

In one example, the pressure-sensitive adhesive layer included in the foldable display may have a peel force on the adherend of 2,000 gf/in or more, as measured at a peel angle of 180° and a peel rate of 0.3 mm/min.

In another example, the pressure-sensitive adhesive layer may have a peel force on the adherend of 2,200 gf/in or more, or 2,400 gf/in or more, as measured at a peel angle of 180° and a peel rate of 0.3 mm/min.

As the method of forming the pressure-sensitive adhesive layer, for example, a method of coating a composition comprising a first pressure-sensitive adhesive, a second pressure-sensitive adhesive, additives and other solvents, and the like on any support and then curing it can be used.

The method of coating and curing is not particularly limited, and for example, may comprise coating using a known method such as bar coating, gravure coating, reverse roll coating, reverse gravure coating, slot die coating, comma coating, spray coating, knife coating, die coating, dip coating, micro gravure coating or wire bar coating, followed by curing with application of appropriate heat.

Advantageous Effects

The present application can provide a pressure-sensitive adhesive composition having appropriate bending reliability suitable to apply to a foldable display and also having excellent pressure-sensitive adhesive properties or cohesive force, and a use thereof.

MODE FOR INVENTION

Hereinafter, the pressure-sensitive adhesive composition for a foldable display according to the present application and the display comprising the same will be described in detail with reference to Examples and Comparative Examples, but the following examples are only examples according to the present application, and thus do not limit the technical idea of the present application.

The physical properties of the pressure-sensitive adhesive composition of the present application were evaluated by the following methods.

1. Measurement of Storage Elastic Modulus

A pressure-sensitive adhesive composition prepared in Examples and Comparative Examples was coated between release films and cured, and then tailored to a size of 15 cm×25 cm, and laminated several times to have a thickness of about 1 mm, after removing the release film on one side. Subsequently, the laminate was tailored into a circle having a diameter of 8 mm and compressed using glass, and then a sample was prepared by allowing the laminate to stand overnight to improve wetting at the interfaces between the layers and removing bubbles generated upon lamination. Subsequently, the sample was placed on a parallel plate, the gap was adjusted, the zero point of Normal & Torque was set, and the storage elastic modulus was measured after confirming stabilization of Normal force.

(1) Measuring Instruments and Measuring Conditions

Measuring instrument: ARES-RDA equipped with a forced convection oven, TA Instruments Inc. (G2 series Rheometer)

(2) Measurement Conditions

Geometry: 8 mm parallel plate
Interval: about 1 mm
Test type: dynamic strain frequency sweep
Strain=0.1 [%]
Initial temperature: −40° C., final temperature: 90° C.
Frequency: 6.2 rad/s 2. Peel Force Measurement The pressure-sensitive adhesive layer prepared according to Examples and Comparative Examples was attached to a glass substrate or a surface-treated PI base film as an adherend and then subjected to aging under a condition of 50° C. and 5 atm for 1 hour or at room temperature for 3 days. After aging, the peel force was measured at a peel rate of 0.3 m/min and a peel angle of 180 degrees at room temperature using a tensile tester (Texture Analyzer).

3. Measurement of Releasing Peel Force

After the pressure-sensitive adhesive layers according to Examples or Comparative Examples were each set to have a width of 1 inch and stored under 25° C. and 50% relative humidity for 1 week, peel force of the pressure-sensitive adhesive layer on medium peeling type and light peeling type fluorine-based release films (TACS TS-502S) (peel rate: 0.3 m/min, peel angle: 180) was measured.

The measurement was carried out under a constant temperature and humidity condition, and the peel force was measured using a texture analyzer on the basis of ASTM 3330.

Example 1

Preparation of Pressure-Sensitive Adhesive Composition (A1)

A first pressure-sensitive adhesive comprising a first polysiloxane gum with a vinyl group content of 0.5 mol % and a number average molecular weight of about 600,000, and about 0.001 wt % or so of a MQ resin with a structure of Formula 2 (R is an alkyl group having 1 to 2 carbon atoms), and having a peel force on a glass substrate of about 2 gf/in, and a second pressure-sensitive adhesive comprising a second polydimethylsiloxane silicone gum containing hydroxy groups at both ends and having a number average molecular weight of 700,000, and about 38 wt % of the MQ resin, and having a peel force on a glass substrate of about 337 gf/in were mixed with a solvent, but a pressure-sensitive adhesive composition (A1) was prepared by adjusting the content of the first pressure-sensitive adhesive to about 10 wt % relative to the total solid content of the composition.

Formation of Pressure-Sensitive Adhesive Layer (B1)

The pressure-sensitive adhesive composition (A1) was coated on the primer-treated PET base material and cured to form a pressure-sensitive adhesive layer (B1), where the pressure-sensitive adhesive layer (B1) was subjected to surface modification.

Example 2

A pressure-sensitive adhesive composition (A2) was prepared in the same manner as in Example 1 except that the content of the first pressure-sensitive adhesive was adjusted to about 30 wt % relative to the total solid content of the composition, and a pressure-sensitive adhesive layer (B2) was formed using this composition and subjected to surface modification.

Comparative Example 1

A pressure-sensitive adhesive composition (A3) composed of only the first pressure-sensitive adhesive according to Example 1 and a solvent was prepared, and a pressure-sensitive adhesive layer (B3) was formed in the same manner as in Example 1 using this composition and subjected to surface modification.

Comparative Example 2

A pressure-sensitive adhesive composition (A4) composed of only the second pressure-sensitive adhesive according to Example 1 and a solvent was prepared, and a pressure-sensitive adhesive layer (B4) was formed in the same manner as in Example 1 using this composition and subjected surface modification.

Experimental Example 1—Measurement of Peel Force on Glass Substrate or PI Base Film The peel forces of the pressure-sensitive adhesive layers according to Examples 1 and 2 and Comparative Examples 1 and 2 on a glass substrate or a PI base film were measured, and the results were shown in Table 1 below.

TABLE 1

|  | Example | | Comparative Example | |
|---|---|---|---|---|
|  | 1 | 2 | 1 | 2 |
| Peel force on glass substrate (gf/in) | 32 | 28 | 2 | 337 |
| Peel force on PI base film (gf/in) | 2,200 | 2,700 | — | 1200 |

As described in Table 1 above, it could be confirmed that when the pressure-sensitive adhesive layers were formed using the pressure-sensitive adhesive compositions according to Examples 1 and 2 of the present application, they had excellent adhesive force on the glass substrate or the PI base film, but in the case of the low pressure-sensitive adhesive layer according to Comparative Example 1, although the change of the storage elastic modulus was small as shown in Table 2 below, they were not suitable as a pressure-sensitive adhesive composition for a foldable display due to the rarely measured low pressure-sensitive adhesive force.

Experimental Example 2—Measurement of Storage Elastic Modulus

In order to examine the storage elastic modulus change rate depending on temperatures after curing of the compositions according to Examples 1 and 2, the storage elastic modulus at −40° C. and 90° C. was measured according to the above-described measuring method using an ARES-RDA, an equipment of TA instruments, equipped with a forced convection oven and the results were shown in Table 2.

TABLE 2

|  | Example | | Comparative Example | |
|---|---|---|---|---|
|  | 1 | 2 | 1 | 2 |
| Storage elastic modulus at −40° C. (Pa) | $1.8 \times 10^5$ Pa | $1.8 \times 10^5$ Pa | $8 \times 10^5$ Pa | $3 \times 10^5$ Pa |
| Storage elastic modulus at 90° C. (Pa) | $1.1 \times 10^5$ Pa | $1.7 \times 10^5$ Pa | $7 \times 10^5$ Pa | $3 \times 10^4$ Pa |

Experimental Example 3—Measurement of Releasing Peel Force

After the pressure-sensitive adhesive layers according to Examples 1 and 2 and Comparative Examples 1 and 2 were each set to have a width of 1 inch and stored under 25° C. and 50% relative humidity for 1 week, the pressure-sensitive adhesive layers were each attached to medium peeling type and light peeling type fluorine-based release films and then it was measured at a peel rate of 0.3 m/min and peel angle of 180 degrees using a texture analyzer on the basis of ASTM3330, and the results were shown in Table 3 below.

TABLE 3

|  | Example | | Comparative Example | |
|---|---|---|---|---|
| Condition | 1 | 2 | 1 | 2 |
| Light peeling type fluorine-based release film (gf/in) | 7 | 4 | 2 | 9.1 |
| Medium peeling type fluorine-based release film (gf/in) | 11 | 8 | — | 76.8 |

As described in Experimental Examples 1 to 3 and Tables 1 to 3, in the case of the pressure-sensitive adhesive layers according to Examples 1 and 2, since they have appropriate adhesive force and cohesive force and exhibit the storage elastic modulus at a temperature of −40° C. of $5.0 \times 10^6$ Pa or less, not only the folding reliability required in the foldable display can be ensured, but also the releasing peel force can be maintained in a very low range to exhibit excellent release force.

The invention claimed is:

1. A pressure-sensitive adhesive composition for a foldable display comprising:
   a first pressure-sensitive adhesive comprising a first silicone gum and a first MQ resin, and having a peel force on a glass substrate, as measured at a peel rate of 0.3 m/min and a peel angle of 180 degrees, of 10 gf/in or less; and
   a second pressure-sensitive adhesive comprising a second silicone gum and a second MQ resin, and having a peel force on a glass substrate, as measured at a peel rate of 0.3 m/min and a peel angle of 180 degrees, of 200 gf/in to 400 gf/in,
   wherein said first pressure-sensitive adhesive is contained in an amount of 5 wt % to 50 wt % relative to the total solid content of the composition,
   wherein MQ resin is a silicone compound having at least a three-dimensional reticular steric molecular structure comprising a monofunctional siloxane unit (M Unit) and a tetrafunctional siloxane unit (Q unit), and
   the composition satisfies Equation 1 below:

$$A < 20 \text{ gf/in} \qquad \text{[Equation 1]}$$

wherein, A means a peel force of a pressure-sensitive adhesive layer formed by curing the pressure-sensitive adhesive composition on a fluorine-based release film, as measured at a peel rate of 0.3 m/min and a peel angle of 180 degrees.

2. The pressure-sensitive adhesive composition for a foldable display according to claim 1, wherein the first or second silicone gum is represented by Formula 1 below:

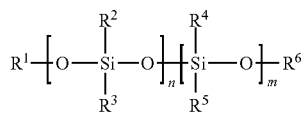

[Formula 1]

wherein, $R^1$ and $R^6$ are each independently a silyl group or silanol group with or without an alkyl group, an alkenyl group or an aryl group, $R^2$ to $R^5$ are each independently an alkyl group, an alkenyl group or an aryl group, and n and m are each independently an integer in a range of 1 to 10,000.

3. The pressure-sensitive adhesive composition for a foldable display according to claim 1, wherein the first pressure-sensitive adhesive comprises the first MQ resin in a content of less than 5 wt %.

4. The pressure-sensitive adhesive composition for a foldable display according to claim 1, wherein the first silicone gum has a number average molecular weight in a range of 400,000 to 800,000.

5. The pressure-sensitive adhesive composition for a foldable display according to claim 1, wherein the first silicone gum has a vinyl group content in a range of 0.5 to 1.5 mol %.

6. The pressure-sensitive adhesive composition for a foldable display according to claim 1, wherein the second pressure-sensitive adhesive has a storage elastic modulus measured at −40° C. of 10 Pa or less.

7. The pressure-sensitive adhesive composition for a foldable display according to claim 1, wherein the second pressure-sensitive adhesive comprises the second MQ resin in a content of 40 wt % or less.

8. The pressure-sensitive adhesive composition for a foldable display according to claim 1, wherein the second silicone gum is a linear polydimethylsiloxane containing hydroxy groups at both ends.

9. The pressure-sensitive adhesive composition for a foldable display according to claim 1, wherein a storage elastic modulus (G') after curing is $5\times10^6$ Pa or less within a temperature range of −40° C. to 90° C.

10. A foldable display comprising a pressure-sensitive adhesive layer which is a cured product of the pressure-sensitive adhesive composition for a foldable display of claim 1 attached to an adherend.

11. The foldable display according to claim 10, wherein the adherend is a base film, and said base film and said pressure-sensitive adhesive layer form covalent bonds via silanol groups contained in said pressure-sensitive adhesive layer.

12. The foldable display according to claim 10, wherein the pressure-sensitive adhesive layer has a peel force on the adherend as measured at a peel rate of 0.3 m/min and a peel angle of 180 degrees of 2,000 gf/in or more.

* * * * *